United States Patent Office 3,194,825
Patented July 13, 1965

3,194,825
(ISOTHIOCYANATOALKYL)AMINES
Thomas K. Brotherton, South Charleston, and John W. Lynn, Charleston, W. Va., assignors to Union Carbide Corporation, a corporation of New York
No Drawing. Filed Apr. 19, 1962, Ser. No. 188,834
2 Claims. (Cl. 260—454)

The present invention relates to (isothiocyanatoalkyl)-amines and more specifically it relates to mono-, bis-, and tris-(isothiocyanatoalkyl)amines and related compounds, which have been found to be highly biologically active and are particularly useful as fungicides, and methods for their preparation.

The compounds of the present invention are represented by the following general formulae:

(1) $\qquad [SCN(C_aH_{2a})]_xN(R)_{3-x}$ wherein $a$ is an integer having a value of from 1 to 6 inclusive, $x$ is an integer having a value of from 1 to 2 inclusive and R is a monovalent hydrocarbon group generally containing from 1 to 14 carbon atoms inclusive.

Illustrative of such monovalent hydrocarbon groups are alkyl groups, generally containing from 1 to 10 carbon atoms inclusive, such as methyl, ethyl, propyl, isopropyl, butyl, isobutyl, sec-butyl, tert-butyl, pentyl, hexyl, heptyl, octyl, nonyl, decyl, and the like; aryl groups generally containing from 6 to 14 carbon atoms inclusive, such as phenyl, naphthyl, biphenyl and the like; aralkyl groups generally containing from 7 to 11 carbon atoms inclusive, such as benzyl, phenethyl, phenylpropyl, phenylbutyl and the like; and alkaryl groups generally containing from 7 to 11 carbon atoms inclusive, such as tolyl, xylyl, propylphenyl and the like;

(2) $\qquad [SCN(C_bH_{2b})]_3N$ wherein $b$ is an integer having a value of from 3 to 6 inclusive;

(3) $[SCN(C_cH_{2c})]_yN(R')_{2-y}$
$\qquad\qquad GN(R')_{2-y}[(C_cH_{2c})NCS]_y$ wherein $c$ is an integer having a value of from 1 to 6 inclusive, $y$ is an integer having a value of from 1 to 2 inclusive, R' is as defined for R and G is a divalent hydrocarbon group, generally containing from 1 to 14 carbon atoms inclusive.

Illustrative of such divalent hydrocarbon groups are the alkylene groups, generally containing from 1 to 10 carbon atoms inclusive, such as methylene, ethylene, propylene, trimethylene, 1,2-butylene, 1,3-butylene, tetramethylene, pentamethylene, 1,2-pentylene, 1,3-pentylene, 1,4-pentylene, hexamethylene, heptamethylene, octamethylene, nonamethylene, decamethylene, and the like; and the arylene groups generally containing from 6 to 14 carbon atoms inclusive, such as phenylene, diphenylene, 2,2-bis(phenylene)propane and the like.

Included in the definition of G are those groups which function as divalent hydrocarbon groups but which are in fact two or more divalent hydrocarbon groups connected by a non-carbon group. Illustrative of such non-carbon groups are sulfide, sulfoxy, sulfone, ether, ester and the like.

The hydrocarbon groups represented by R, R' and G can be substituted by functional groups such as halo groups, for example, fluoro, chloro, bromo and iodo; nitro groups and the like.

The compounds of the present invention can be prepared from (aminoalkyl)amines represented by Formulae 4, 5, and 6 below. Compounds falling within the scope of Formula 1 are prepared from the corresponding amines falling within the scope of Formula 4; compounds falling within the scope of Formula 2 are prepared from the corresponding amines falling within the scope of Formula 5; and compounds falling within the scope of Formula 3 are prepared from the corresponding amines falling within the scope of Formula 6.

(4) $\qquad [H_2N(C_aH_{2a})]_xN(R)_{3-x}$ wherein $a$, $x$, and R have been previously defined;

(5) $\qquad [H_2N(C_bH_{2b})]_3N$ wherein $b$ has been previously defined; and (6) $[H_2N(C_cH_{2c})]_yN(R')_{2-y}$
$\qquad\qquad GN(R')_{2-y}[(C_cH_{2c})NH_2]_y$ wherein $c$, $y$, R' and G have been previously defined.

The preparation of the amines illustrated by Formulae 4 through 6 inclusive is well-known in the art. One method for preparing these amines is by first forming a nitrile, by the methods disclosed in U.S. Patents 2,228,271 to Jacobson et al., patented January 14, 1941 and 2,816,129 to Montgomery, patented December 10, 1957, and thereafter hydrogenating the nitrile under pressure in the presence of a catalyst, such as Raney Nickel, to form the desired amine.

The following reaction diagram is illustrative of the preparation of the (aminoalkyl)amines:

Reaction A:

$G[NH(R')]_2 + 2CH_2=CH-CN$
$\qquad\qquad \rightarrow G[N(R')(CH_2)_2-CN]_2$ $G[N(R')(CH_2)_2-CN]_2 + 2H_2$
$\qquad\qquad \rightarrow G[N(R')(CH_2)_3-NH_2]_2$ wherein G and R' are as defined above.

The (aminoalkyl)amines, represented by Formulae 4, 5, and 6 are then reacted with an alkali metal hydroxide, such as lithium hydroxide, potassium hydroxide, sodium hydroxide, and the like, or an alkaline earth metal hydroxide, such as barium hydroxide, calcium hydroxide, strontium hydroxide, and the like, and carbon disulfide, to form the corresponding alkali or alkaline earth metal (dithiocarbamatoalkyl)amines as illustrated by Formulae 7, 8, and 9 below, wherein the (aminoakyl)amines falling within the scope of Formula 4 are used to form the corresponding dithiocarbamates falling within the scope of Formula 7, the (aminoalkyl)amines falling within the scope of Formula 5 are used to form the corresponding dithiocarbamates falling within the scope of Formula 8 and the (aminoalkyl)amines of Formula 6 are used to form the corresponding dithiocarbamates falling within the scope of Formula 9.

(7) $\qquad [MS-\overset{S}{\underset{\|}{C}}NH(C_aH_{2a})]_xN(R)_{3-x}$ wherein M is an alkali metal ion or alkaline earth metal ion, and $a$, R and $x$ have been previously defined;

(8) $\qquad [MS-\overset{S}{\underset{\|}{C}}NH(C_bH_{2b})]_3N$ wherein M, and $b$ have been previously defined; and, (9) $[MS-\overset{S}{\underset{\|}{C}}NH(C_cH_{2c})]_yN(R')_{2-y}GN(R')_{2-y}[(C_cH_{2c})NH\overset{S}{\underset{\|}{C}}-SM]_y$ wherein M, $c$, $y$, R', and G have been previously defined.

The alkali metal or alkaline earth metal salt of the (dithiocarbamatoalkyl)amine, typified by Formulae 7 through 9 above is then converted to the corresponding (isothiocyanatoalkyl)amine by reaction with a haloformate, in the presence of alkali metal or alkaline earth metal hydroxide.

The following reaction diagram is exemplary of the preparation of the alkali or alkaline earth metal (dithiocarbamatoalkyl)amines. The amine illustrated below falls within the scope of Formula 6 above and the corresponding dithiocarbamate formed falls within the scope of Formula 9 above.

Reaction B:

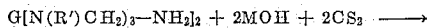

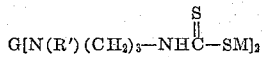

wherein G, R' and M have been previously defined and MOH is an alkali or alkaline earth metal hydroxide.

The amine is admixed with the hydroxide, preferably as an aqueous solution, and the carbon disulfide is added to the mixture. The temperature of the reaction mixture is maintained at from about −10° C. to about 130° C., preferably about 25° C. to about 100° C.

Carbon disulfide is generally used in an amount of from about 1 mole to about 3 moles, per mole equivalent of the (aminoalkyl)amine used, based upon the number of primary amine groups on the (aminoalkyl)amine and preferably from about 1 mole to about 1.3 moles, per mole equivalent of the (aminoalkyl)amine, based upon the number of primary amine groups on the (aminoalkyl)-amine. While an amount of carbon disulfide greater than about 3 moles, per mole equivalent of the (aminoalkyl)-amine, can be used, it is not feasible as it unduly increases production costs.

The carbon disulfide is preferably added to the hydroxide-amine mixture slowly in order to obtain better temperature control.

The alkali or alkaline earth metal hydroxide is generally used in an amount of from about 1 mole to about 3 moles, per mole equivalent of (aminoalkyl)amine, based upon the number of primary amine groups on the (aminoalkyl)amine, and preferably from about 1 mole to about 1.1 moles, per mole equivalent based on the number of primary amine groups on the (aminoalkyl)-amine. While an amount of alkali or alkaline earth metal hydroxide greater than about 3 moles, per mole equivalent of the (aminoalkyl)amine, can be used, it is not feasible as it unduly increases production costs.

As stated, the hydroxide is preferably used as an aqueous solution, as this permits greater reaction control.

This reaction can be conducted at atmospheric or superatmospheric pressure with atmospheric pressure being preferred.

Diluents can be used in conducting the reaction provided they are non-reactive in respect to the reactants and the products.

Suitable diluents include water; aromatic hydrocarbons such as benzene, toluene, xylene and the like; aliphatic hydrocarbons such as hexane, heptane, octane, nonane and the like; halogenated hydrocarbons such as chloroform, carbon tetrachloride, chlorobenzene, and the like; ethers such as methyl ether, ethyl ether, biphenyl ether and the like; sulfones such as isopropyl sulfone, butyl sulfone, pentyl sulfone and the like.

When the reaction has reached completion, the product carbamate salt, illustrated by Formulae 7, 8, and 9 above, can be conveniently isolated by cooling the reaction mixture and filtering out the salt. If, however, the carbamate salt is to be used for the preparation of the corresponding (isothiocyanatoalkyl)amines as illustrated by Reaction C below, there is no necessity to separate the salt as it can be and is preferably used as the reaction product liquor of Reaction B.

The following reaction diagram is exemplary of the preparation of the (isothiocyanatoalkyl)amines of this invention.

Reaction C:

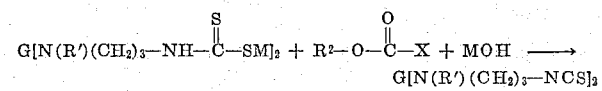

wherein G, R', M, and MOH have been previously defined,

X is a halogen group, such as fluoro, chloro, bromo or iodo, and $R^2$ is a monovalent hydrocarbon group generally containing from 1 to 14 carbon atoms inclusive. Illustrative of such monovalent hydrocarbon groups are alkyl groups generally containing from 1 to 6 carbon atoms inclusive, such as methyl, ethyl, propyl, ispropyl, isobutyl, butyl, penyl, and the like; aryl groups generally containing from 6 to 14 carbon atoms inclusive, such as phenyl, tolyl, xylyl, naphthyl and the like; and aralkyl groups generally containing from 7 to 14 carbon atoms inclusive, such as benzyl, phenethyl and the like. Ethyl chloroformate is the preferred haloformate because of its availability, activity, and stability.

In the preparation of the (isothiocyanatoalkyl)amines, the alkali or alkaline earth metal carbamate salt formed in Reaction B above, is admixed with an alkali or alkaline earth metal hydroxide. To this mixture is then added a haloformate having the formula:

wherein $R^2$ and X have been previously defined, and the reaction mixture is heated to and maintained at a temperature of from about 20° C. to about 80° C. and preferably at a temperature of from about 30° C. to about 50° C. for a period of from about 2 to about 60 minutes.

The haloformate is generally used in an amount of from about 1 to about 3 moles, per mole equivalent of carbamate salt based upon the number of dithiocarbamato groups present on the (dithiocarbamatoalkyl)amine salt and is preferably used in an amount of from about 1.1 moles per mole equivalent, based upon the number of dithiocarbamato groups present on the (dithiocarbamatoalkyl)amine salt. While an amount of haloformate greater than about 3 moles, per mole equivalent of carbamate salt can be used, it is not economically feasible as it unduly increases production costs.

The alkali or alkaline earth hydroxide is used in an amount sufficient to create and maintain a pH greater than 7.0 and preferably greater than 7.1 throughout the entire reaction period.

As stated previously, the reaction product liquor of Reaction B can be used directly without the separation of the carbamate salt. When this reaction product liquor is used, an alkali or alkaline earth metal hydroxide is added, if necessary, in an amount sufficient to create and maintain a pH greater than 7.0 and preferably greater than 7.1 in the reaction mixture throughout the entire reaction period.

Diluents can be used in conducting the reaction provided they are non-reactive in respect to the reactants and the products. Suitable diluents are the same as described above for use in the dithiocarbamate preparation in Reaction B.

Although it is preferred to conduct the reaction at atmospheric pressure, that is about 14.9 pounds per square inch, this reaction can be conducted at superatmospheric pressure, provided, of course, proper pressure equipment is used.

The product (isothiocyanatoalkyl)amine is generally recovered as an oily liquid from the reaction mixture by any suitable separation procedure, e.g., decantation, distillation, and the like.

The compounds of the present invention, both the dithiocarbamate salts and the isothiocyanates exhibit a high degree of biological activity and are particularly useful as fungicides. These compounds can be used as agricultural fungicides or incorporated in nutrients such as agar to prevent fungus growth. To facilitate dispersion of these compounds it has been found desirable to first dissolve them in acetone and utilize the acetone solution in compounding fungicidal compositions.

When utilized as agricultural fungicides, these compounds are preferably applied in conjuction with a diluent or an extender. The extender may be either a liquid or a powdered solid. For application as dusting compositions, the compounds may be so admixed with finely divided solid inert materials as to provide homogeneous free-flowing dusts. The usual pulverized inert materials can be used, preferably talcs, neutral clays, pyrophyllite, diatomaceous earth, cottonseed flour, or any other flours. Other inert solid carriers are: magnesium or calcium carbonates, calcium phosphate, and the like, either in powder or granular form.

The percent by weight of the essential active ingredient will vary according to the manner in which the composition is to be applied, but, in general, will be from about 0.5 to 95 percent by weight of the dust. The preferred percentage range of the active essential ingredient is from about 25 to about 75 percent by weight, based upon the total weight of the dusting composition. The inert carriers may be sustituted in whole or in part by other materials when it is desired to apply the fungicidal compositions to the soil, for instance, fertilizers, soil conditioners, and the like.

Liquid fungicidal compositions are preferably applied with water as the extender, as the compounds of the present invention are highly stable as aqueous dispersions; the amount of water used depends principally upon the convenience to the agriculturist and upon the type of spraying apparatus which he customarily uses. Sprays which are toxic to fungi usually contain from about 0.1 to about 95 percent by weight of the active essential ingredient based upon the total weight of the spray and preferably contain from about 25 to about 85 percent by weight of the active essential ingredient based upon the total weight of the spray.

In the case of aqueous sprays, it is desirable to have the fungicidal compound in homogeneous dispersion and for this purpose a surface-active agent is preferably used. Substantially any wetting, emulsifying, dispersing or penetrating agent can be used whether anionic, cationic or nonionic. The preferred sprays contain the fungicidal compound with from about 0.1 percent to about 15 percent by weight of a surface-active agent with a sufficient amount of the fungicidal compound and water to make 100 parts by weight. For general use, the weight of surface-active agent will be from about 5 percent to about 10 percent of the weight of the active ingredient in the spray. Suitable surface-active agents are, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid, alkylnaphthalene, sodium sulfonate, sodium salts of sulfonated condensation products of naphthalene and formaldehyde, sodium lauryl sulfate, disodium monolauryl phosphate, sorbitol laurate, pentaerythritol monostearate, glycerol monosterate, diglycol oleate, polethylene oxides, ethylene oxide condensation products with stearyl alcohol and octylphenol, polyvinyl alcohols, salts, such as acetates of polyamines derived from reductive amination of ethylene carbon monoxide polymers, lauryl-amine hydrochloride, lauryl pyridinium bromide, stearyltrimethylammonium bromide, cetyldimethylbenzyl ammonium chloride, lauryldimethylamine oxide, and the like.

The compounds contemplated herein can be used with or without "addends," for instance, insecticides, such as rotenone, "DDT" or nicotine sulfate, or those addends which cause the fungicides to adhere evenly and strongly to plant foliage, such as methyl cellulose.

When the compounds are incorporated into nutrient compositions, they may be introduced as an acetone-water dispersion containing a surface-active agent. Suitable surface-active agents have been heretofore described.

Tests were performed in order to evaluate the fungicidal activity of the compounds of the present invention.

BIOLOGICAL TESTS PERFORMED (A) *Bean mildew test.*—Greenhouse tests were conducted using compounds of this invention for control of powdery mildew of beans caused by the fungus *Erysiphe polygoni.*

Aqueous suspensions of the test compound were prepared by dissolving the compound in acetone, incorporating sorbitol laurate as an emulsifying agent and diluting the solution with water. Six individual bean plants of about 7 days of age, with primary leaves expanded, which had been inoculated 48 hours previously by dusting with the fungus *Erysiphe polygoni* were sprayed for 30 seconds each with the aqueous suspension of the test compound. An additional six bean plants which had also been inoculated with the fungus 48 hours earlier were sprayed with an equal amount of acetone-emulsifier-water solution, and maintained under identical conditions as controls. All plants were then placed in a greenhouse and after 7 to 10 days were examined for mildew. At the end of the test period the control plants showed 90 to 100 percent of leaf surface covered with mildew. The efficacy of the test compounds was determined by the use of the following equation:

$$E = \frac{L_c - L}{L_c} \times 100$$

wherein:

$E$=efficiency of the test compound in percent.
$L_c$=the average number of lesions per control plant.
$L$=the average number of lesions per plant sprayed with test compound:

| Compound evaluated: | Efficiency in percent |
|---|---|
| Tris(3-isothiocyanatopropyl)amine at a concentration of— | |
| 1000 parts per million | 100 |
| 100 parts per million | 100 |
| N,N-diethyl-N-(3-isothiocyanatopropyl)amine at a concentration of— | |
| 1000 parts per million | 95 |
| 100 parts per million | 90 |
| N-ethyl-N,N-bis(2-isothiocyanatoethyl)amine at a concentration of— | |
| 1000 parts per million | 100 |
| 100 parts per million | 95 |
| N,N,N',N'-tetra(3-isothiocyanatopropyl)p-phenylenediamine at a concentration of— | |
| 1000 parts per million | 100 |
| 100 parts per million | 100 |
| Sodium N,N-diethyl-N-(3-dithiocarbamatopropyl)amine at a concentration of— | |
| 1000 parts per million | 100 |
| 100 parts per million | 95 |
| Sodium N-ethyl-N,N-bis(2-dithiocarbamatoethyl)amine at a concentration of— | |
| 1000 parts per million | 100 |
| 100 parts per million | 100 |
| Sodium N,N,N',N'-tetra(3-dithiocarbamatopropyl)p-phenylenediamine at a concentration of— | |
| 1000 parts per million | 100 |
| 100 parts per million | 100 |

FUNGICIDE AGAR INCORPORATION TEST (B) The test compound tris(3-isothiocyanatopropyl)-amine was dissolved in an acetone solution of sorbitol laurate, an emulsifying agent. This solution was then diluted with water to give two test solutions having a concentration of 1000 parts per million and 100 parts per million respectively.

The agar nutrient used had the following composition:

| | Grams |
|---|---|
| Potato dextrose sugar | 45 |
| Bacto agar | 5 |
| Distilled water | 1000 |

This composition was prepared by dissolving the solid ingredients in the distilled water by heating in a steam oven. Eighteen milliliter aliquots of the nutrient solution were placed in 50 milliliter Erlenmeyer flasks and were sterilized by heating in an autoclave for 20 minutes.

The nutrient media aliquots were melted, then cooled to a temperature of from 50° C. to 60° C. and 2 milliliters of the test solutions were added. The flasks were agitated to insure uniform dispersion and the nutrient media containing the test compound were immediately transferred to sterile Petri dishes. Media were prepared for each of the test organisms.

The test was carried out for the following test organisms:

(1) *Fusarium gladiola*
(2) *Aspergillis oryzae*
(3) *Penicillium piscarium*
(4) *Pullularia*

The agar nutrient, containing the test compound, was inoculated with the test organisms by streaking the nutrient surface with a sterile wire loop which had been dipped into a tube containing a culture of the test organism.

The ability of the compound to inhibit the growth of fungi was rated according to the following designations:

(5) No growth
(4) Slight growth
(3) Moderate growth
(2) Heavy growth
(1) Severe growth The following results were obtained with both test solutions:

Fusarium gladiola _____ 5
Aspergillis oryzae _____ 5
Penicillium piscarium _____ 5
Pullularia _____ 5

*Example 1.*—Preparation of the sodium salt of tris-(3-dithiocarbamatopropyl)amine A mixture of 56.0 grams (0.3 mole) of tris(3-aminopropyl)-amine, 50 grams (1.2 moles) of sodium hydroxide, as an 85 percent by weight aqueous solution, and 157 milliliters of water, was prepared by admixing in a 2 liter flask. This mixture was cooled to, and maintained at, a temperature of 0° C. while 91.2 grams (1.2 moles) of carbon disulfide, also having a temperature of 0° C., was slowly added. When the addition of the carbon disulfide had been completed, the temperature of the reaction mixture was increased to 100° C., the mixture was maintained at this temperature for a period of 30 minutes, and was then cooled in an ice bath. The sodium salt of tris(3-dithiocarbamatopropyl)amine was recovered, by filtration, in an amount of 82.8 grams.

*Example 2.*—Preparation of tris(3-isothiocyanatopropyl)-amine

One hundred and sixty grams (0.3 mole) of sodium tris-(3-dithiocarbamatopropyl)amine was dissolved in 250 milliliters of water. To this solution was added 50 grams (1.2 moles) of sodium hydroxide, which raised and maintained the pH of the reaction mixture at a value greater than 7.1. After the sodium hydroxide had dissolved, 128.6 grams (1.19 moles) of ethyl chloroformate was slowly added and the mixture agitated by stirring for a period of two hours. During this period of agitation, an oil layer formed in the flask. The aqueous portion of the reacted mixture was separated by decantation and the residual oil layer was agitated vigorously with an additional 50 grams (1.2 moles) of sodium hydroxide as a 50 percent aqueous solution.

The resulting oil layer was once again separated from the aqueous layer by decantation, and purified by removing all volatile impurities by boiling the product at a temperature of 40° C. and a reduced pressure of 10 millimeters of mercury for a period of 30 minutes. A total of 81 grams of the product, tris-(3-isothiocyanatopropyl)-amine was recovered having the following properties:

Physical state—Red liquid
Refractive index—$n_D^{30}$ 1.5906

(a) Sodium N,N-diethyl-N-(3-dithiocarbamatopropyl)-amine by replacing the 0.3 mole of tris(3-aminopropyl)amine with 0.9 mole of N,N-diethyl-N-(3-aminopropyl)amine.

(b) Sodium N-ethyl-N,N-bis(2-dithiocarbamatoethyl)-amine by replacing the 0.3 mole of tris(3-aminopropyl)amine with 0.45 mole of N-ethyl-N,N-bis(2-aminoethyl)amine.

(c) Sodium N,N,N',N'-tetra(3-dithiocarbamatopropyl)-p-phenylenediamine by replacing the 0.3 mole of tris(3-aminopropyl)amine with 0.22 mole of N,N,N',N'-tetra(3-aminopropyl)-p-phenylenediamine.

(d) Potassium tris(3-dithiocarbamatopropyl)amine by replacing the 1.2 moles of sodium hydroxide with an equivalent amount of potassium hydroxide.

(e) Calcium tris(3-dithiocarbamatopropyl)amine by replacing the 1.2 moles of sodium hydroxide with an equivalent amount of calcium hydroxide.

The following compounds were prepared utilizing the methods of Example 2.

(f) N,N-diethyl-N-(3-isothiocyanatopropyl)amine by replacing the 0.3 mole of sodium tris(3-dithiocarbamatopropyl)amine with 0.9 mole of sodium N,N-diethyl-N-(3-dithiocarbamatopropyl)-amine.

(g) N-ethyl-N,N-bis(2-isothiocyanatoethyl)amine by replacing the 0.3 mole of sodium tris(3-dithiocarbamatopropyl)-amine with 0.45 mole of sodium N-ethyl-N,N-bis(2-dithiocarbamatoethyl)amine.

(h) N,N,N',N'-tetra(3-isothiocyanatopropyl)-p-phenylenediamine by replacing the 0.3 mole of sodium tris(3-dithiocarbamatopropyl)amine with 0.21 mole of sodium N,N,N',N'-tetra(3-dithiocarbamatopropyl) - p-phenylenediamine.

*Example 3.*—Preparation of tris(3-isothiocyanatopropyl)-amine

A mixture of 56.0 grams (0.3 mole) of tris(3-aminopropyl)-amine, 50 grams (1.2 moles) of sodium hydroxide, as an 85 percent aqueous solution, and 157 milliliters of water was prepared by admixing in a 2 liter flask. This mixture was cooled to and maintained at a temperature of 0° C. while 91.2 grams (1.2 moles) of carbon disulfide, also having a temperature of 0° C., was slowly added. When the addition of carbon disulfide had been completed, the temperature of the reaction mixture was increased to 100° C., the mixture was maintained at this temperature for 38 minutes and then cooled to room temperature. To this reaction product liquor was then added 52 grams of sodium hydroxide, which raised and maintained the pH of the reaction mixture at a value greater than 7.1. After the sodium hydroxide had dissolved, 128.6 grams (1.19 moles) of ethyl chloroformate was added and the reaction mixture was agitated for a period of 2 hours and 20 minutes. At the end of the reaction period the product was recovered as an oil layer by decantation.

The product was purified by removing volatile impurities under a pressure of 10 millimeters of mercury at a temperature of about 40° C. A total of 76.6 grams of product tris(3-isothiocyanatopropyl)amine were recovered as residue. The product had the following characteristic physical properties:

Physical state—Red liquid
Refractive index—$n_D^{30}$ 1.5906

We claim:
1. (Isothiocyanatoalkyl)amines of the formula:

$$[SCN(C_cH_{2c})]_2N-G-N[(C_cH_{2c})NCS]_2$$

wherein c is an integer having a value of from 1 to 6 inclusive and G is an arylene radical of 6 to 14 carbon atoms.

2. N,N,N',N'-tetra(3 - isothiocyanatopropyl)phenylenediamine.

References Cited by the Examiner

UNITED STATES PATENTS

| | | | |
|---|---|---|---|
| Re. 23,742 | 11/53 | Hester | 167—22 |
| 2,325,720 | 8/43 | Urbschat et al. | 167—22 |
| 2,411,253 | 11/46 | Flenner et al. | 167—22 |
| 2,588,428 | 3/52 | Stewart et al. | 167—22 |
| 2,859,235 | 11/58 | Schmidt et al. | 260—454 |
| 2,859,236 | 11/58 | Schmidt et al. | 260—454 |
| 2,866,804 | 12/58 | Nischk et al. | 260—454 |
| 2,910,498 | 10/59 | Meuly | 260—455 |
| 2,972,627 | 2/61 | Garmaise et al. | 260—455 |

FOREIGN PATENTS 898,899  12/53  Germany.

OTHER REFERENCES

Harley-Mason: J. Chem. Soc. (London), vol. of 1947, pp. 320–322.

Horsfall: "Principals of Fungicidal Activity," p. 185 (1956).

Houben-Weyl: "Methoden der Organischen Chemie," vol. 9, pp. 870–873 (1955).

Schmidt et al.: J. Liebigs Ann. der Chem. 594, 233–7 (1955).

Schmidt et al.: J. Liebigs Ann. der Chem. 621, 1–7, (1959).

Slotta et al.: Ber. Deut. Chem. 63, 888–891, (1930).

Postovskii et al.: Akad. Navk S.S.S.R. 132, 141–4 (1960).

CHARLES B. PARKER, *Primary Examiner.*

IRVING MARCUS, *Examiner.*